United States Patent
Xu (10) Patent No.: US 11,531,984 B2
(45) Date of Patent: Dec. 20, 2022

(54) METHOD AND DEVICE FACILITATING EXPANSION OF PRIMARY PAYMENT INSTRUMENTS

(71) Applicant: ADVANCED NEW TECHNOLOGIES CO., LTD., Grand Cayman (KY)

(72) Inventor: Song Xu, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 1035 days.

(21) Appl. No.: 16/227,527

(22) Filed: Dec. 20, 2018

(65) Prior Publication Data

US 2019/0122211 A1    Apr. 25, 2019

Related U.S. Application Data (63) Continuation of application No. PCT/CN2017/088588, filed on Jun. 16, 2017.

(30) Foreign Application Priority Data

Jun. 28, 2016  (CN) .......................... 201610496083.7

(51) Int. Cl.
    *G06Q 20/38*   (2012.01)
    *G06Q 20/22*   (2012.01)
    (Continued)

(52) U.S. Cl.
    CPC ......... *G06Q 20/3829* (2013.01); *G06Q 20/22* (2013.01); *G06Q 20/227* (2013.01);
    (Continued)

(58) Field of Classification Search
    None
    See application file for complete search history.

(56) References Cited

U.S. PATENT DOCUMENTS

| 6,016,484 A | 1/2000 | Williams et al. |
| 7,765,161 B2 | 7/2010 | Mckenney et al. |

(Continued)

FOREIGN PATENT DOCUMENTS

| AU | 2001258665 B2 | 6/2006 |
| CN | 1653751 A | 8/2005 |

(Continued)

OTHER PUBLICATIONS

E. Aleskerov, B. Freisleben and B. Rao, "Cardwatch: a neural network based database mining system for credit card fraud detection," Proceedings of the IEEE/IAFE 1997 Computational Intelligence for Financial Engineering (CIFEr), 1997, pp. 220-226, doi: 10.1109/CIFER.1997.618940. (Year: 1997).*

(Continued)

*Primary Examiner* — Jacob C. Coppola
*Assistant Examiner* — Eduardo Castilho (57) ABSTRACT

A method for facilitating expansion of primary payment instruments comprises: determining a type of a primary payment instrument; determining, from a set of primary key generation rules, a primary key generation rule corresponding to the type of the primary payment instrument, the primary key generation rule specifying at least one primary payment instrument element for generating a primary payment key, each primary key generation rule from the set of primary key generation rules corresponding to a different type of primary payment instrument and specifying at least one primary payment instrument element for generating a primary payment key, each primary payment instrument including a set of primary payment instrument elements; generating, according to the primary key generation rule, a primary payment key for the primary payment instrument; and storing a corresponding relationship between the primary payment instrument and the primary payment key.

18 Claims, 6 Drawing Sheets

(51) Int. Cl.
*G06F 16/903* (2019.01)
*G06Q 20/40* (2012.01)

(52) U.S. Cl.
CPC ....... *G06F 16/903* (2019.01); *G06Q 20/4016* (2013.01); *G06Q 2220/00* (2013.01)

(56) References Cited

U.S. PATENT DOCUMENTS

| | | | |
|---|---|---|---|
| 8,566,168 | B1 | 10/2013 | Bierbaum et al. |
| 8,600,898 | B2 | 12/2013 | Gilder et al. |
| 9,166,999 | B1* | 10/2015 | Kulkarni ................. G06F 21/31 |
| 9,767,453 | B2 | 9/2017 | Kushevsky et al. |
| 2003/0208684 | A1 | 11/2003 | Camacho et al. |
| 2005/0182710 | A1 | 8/2005 | Andersson et al. |
| 2007/0208671 | A1* | 9/2007 | Brown ................. G06Q 20/341 705/65 |
| 2008/0249951 | A1 | 10/2008 | Gilder et al. |
| 2008/0255993 | A1* | 10/2008 | Blinbaum .............. G06Q 20/40 705/44 |
| 2012/0172026 | A1* | 7/2012 | Kwon .................. G06Q 20/354 455/419 |
| 2012/0246075 | A1 | 9/2012 | Rasti |
| 2014/0129360 | A1 | 5/2014 | Kobayashi |
| 2014/0129435 | A1 | 5/2014 | Pardo et al. |
| 2014/0249999 | A1 | 9/2014 | Johnson et al. |
| 2014/0258135 | A1 | 9/2014 | Park et al. |
| 2014/0279559 | A1* | 9/2014 | Smith ................ G06Q 20/3227 705/71 |
| 2014/0298322 | A1* | 10/2014 | Gargiulo .................... G06F 8/61 717/175 |
| 2014/0330722 | A1* | 11/2014 | Laxminarayanan .......................... G06Q 20/385 705/44 |
| 2015/0046339 | A1* | 2/2015 | Wong .................. G06Q 20/322 705/44 |
| 2015/0073996 | A1* | 3/2015 | Makhotin .............. G06Q 20/02 705/71 |
| 2015/0088756 | A1 | 3/2015 | Makhotin et al. |
| 2016/0140538 | A1* | 5/2016 | Einhorn ............... G06Q 20/325 705/67 |
| 2017/0076285 | A1 | 3/2017 | Zhu |
| 2017/0148017 | A1 | 5/2017 | Hu et al. |
| 2017/0323294 | A1* | 11/2017 | Rohlfing ............ G06Q 20/3827 |
| 2017/0337542 | A1 | 11/2017 | Kim et al. |

FOREIGN PATENT DOCUMENTS

| | | |
|---|---|---|
| CN | 101034449 A | 9/2007 |
| CN | 101527070 A | 9/2009 |
| CN | 101686225 A | 3/2010 |
| CN | 101770619 A | 7/2010 |
| CN | 102005087 A | 4/2011 |
| CN | 101436280 B | 9/2012 |
| CN | 103177360 A | 6/2013 |
| CN | 103714461 A | 4/2014 |
| CN | 103999107 A | 8/2014 |
| CN | 104021472 A | 9/2014 |
| CN | 104361490 A | 2/2015 |
| CN | 104376465 A | 2/2015 |
| CN | 104408618 A | 3/2015 |
| CN | 104428803 A | 3/2015 |
| CN | 104903926 A | 9/2015 |
| CN | 105488679 A | 4/2016 |
| CN | 105745678 A | 7/2016 |
| JP | 2002-298055 A | 10/2002 |
| JP | 2014-71532 A | 4/2014 |
| JP | 2015-510628 A | 4/2015 |
| JP | 2016-500182 A | 1/2016 |
| KR | 10-2002-0096353 A | 12/2002 |
| KR | 100441118 B1 | 7/2004 |
| KR | 10-1330943 B1 | 11/2013 |
| KR | 10-2015-0082564 A | 7/2015 |
| WO | 2013/001967 A1 | 1/2013 |

OTHER PUBLICATIONS

Donghua Xu, Chenghuai Lu and A. Dos Santos, "Protecting Web usage of credit cards using One-Time Pad cookie encryption," 18th Annual Computer Security Applications Conference, 2002. Proceedings., 2002, pp. 51-58, doi: 10.1109/CSAC.2002.1176278. (Year: 2002).*

T. K. Behera and S. Panigrahi, "Credit Card Fraud Detection: A Hybrid Approach Using Fuzzy Clustering & Neural Network," 2015 Second International Conference on Advances in Computing and Communication Engineering, 2015, pp. 494-499, doi: 10.1109/ICACCE.2015.33. (Year: 2015).*

O. Dandash, Y. Wang, P. D. Le and B. Srinivasan, "A new Dynamic Key Generation Scheme for Fraudulent Internet Payment Prevention," Fourth International Conference on Information Technology (ITNG'07), 2007, pp. 83-88, doi: 10.1109/ITNG.2007.12. (Year: 2007).*

Search Report for European Application No. 17819117.7 dated Dec. 10, 2019 (7 pages).

Office Action for Japanese Application No. 2018-568369 dated Dec. 3, 2019 (7 pages).

First Search for Chinese Application No. 201610496083.7 dated Jan. 10, 2020 (1 page).

First Office Action for Chinese Application No. 201610496083.7 dated Jan. 20, 2020 with English machine translation (14 pages).

Office Action for Korean Application No. 10-2019-7002321 dated Mar. 9, 2020.

Second Office Action for Chinese Application No. 201610496083.7 dated Mar. 30, 2020.

Third Office Action for Chinese Application No. 201610496083.7 dated May 20, 2020.

Written Opinion of the International Searching Authority and International Search Report for PCT Application No. PCT/CN2017/088588 dated Sep. 18, 2017 (14 pages).

International Preliminary Report on Patentability Chapter I for PCT Application No. PCT/CN2017/088588 dated Jan. 10, 2019 (11 pages).

Office Action and Search Report for Taiwanese Application No. 106112252 dated Apr. 15, 2019 (11 pages).

* cited by examiner

METHOD AND DEVICE FACILITATING EXPANSION OF PRIMARY PAYMENT INSTRUMENTS

CROSS-REFERENCE TO RELATED APPLICATIONS

The present application is a continuation application of International Patent Application No. PCT/CN2017/088588, filed on Jun. 16, 2017, which is based on and claims priority to the Chinese Patent Application No. 201610496083.7, filed on Jun. 28, 2016 and entitled "Method and Device for Facilitating Expansion of Primary Payment Instruments." The above-referenced applications are incorporated herein by reference in their entirety.

TECHNICAL FIELD

The present application relates to the field of Internet technologies, and in particular, to a method and a device for facilitating expansion of primary payment instruments.

BACKGROUND

Along with the rapid development of Internet technologies, electronic payment has gradually taken the place of conventional payment methods due to its advantages of convenience and quickness. In relevant technologies, to ensure secure transmission of user payment information in the process of electronic payment, primary payment instruments, such as bank card numbers, will typically be transmitted in cyphertext. A relevant platform, such as a risk control platform, a financial gateway, and the like, can search for a corresponding primary payment instrument through the cyphertext. In such manner of implementation, however, with the expansion of primary payment instruments, the original model of primary payment instruments has to be continuously upgraded to meet transaction demand, which results in a tremendous amount of development costs.

SUMMARY

In view of the foregoing, the present application provides a method, a device and non-transitory computer-readable storage medium for facilitating expansion of primary payment instruments.

According to one aspect, a method for facilitating expansion of a primary payment instrument, applicable on a server may comprise: determining a type of a primary payment instrument, determining, from a set of primary key generation rules, a primary key generation rule corresponding to the type of the primary payment instrument, the primary key generation rule specifying at least one primary payment instrument element for generating a primary payment key, each primary key generation rule from the set of primary key generation rules corresponding to a different type of primary payment instrument and specifying at least one primary payment instrument element for generating a primary payment key, each primary payment instrument including a set of primary payment instrument elements, generating, according to the primary key generation rule, a primary payment key for the primary payment instrument, and storing a corresponding relationship between the primary payment instrument and the primary payment key.

In some embodiments, generating, according to the primary key generation rule, a primary payment key for the primary payment instrument comprises: acquiring, according to the primary key generation rule, a subset of primary payment instrument elements from the set of primary payment instrument elements of the primary payment instrument, sorting the subset of primary key generating elements according to an order specified by the primary key generation rule, and calculating, according to a preset algorithm, cyphertext of the sorted primary key generating elements as the primary payment key for the primary payment instrument.

In some embodiments, the method further comprises: receiving, from a risk control platform, a primary key query request comprising information of a target primary payment key, searching for a target primary payment instrument corresponding to the target primary payment key, wherein the target primary payment instrument corresponds to a set of target primary payment instrument elements, and sending, to the risk control platform, the set of target primary payment instrument elements of the target primary payment instrument.

In some embodiments, the method further comprises: receiving, from the risk control platform, an element query request comprising risk control elements, wherein the risk control elements are a subset of the set of target primary payment instrument elements; searching for a list of primary payment instruments each including the risk control elements; and sending the list of primary payment instruments to the risk control platform.

In some embodiments, determining a type of a primary payment instrument comprises: receiving a registration request for a primary payment instrument; and determining a type of the primary payment instrument.

In some embodiments, the method further comprises:
when the primary key generation rule is updated, re-generating, according to the updated primary key generation rule, another primary payment key for the primary payment instrument; and
on the basis of storing the corresponding relationship between the primary payment instrument and the original primary payment key, storing a corresponding relationship between the primary payment instrument and the re-generated primary payment key.

In some embodiments, the method further comprises updating the set of primary key generation rules based on an addition of at least one of a new type of primary payment instrument or a new primary payment instrument element for a primary payment instrument of an existing type of primary payment instrument.

According to another aspect, the present disclosure provides a device for facilitating expansion of primary payment instruments. The device comprises one or more processors, and one or more computer-readable memories coupled to the one or more processors and configured with instructions executable by the one or more processors to cause the device to: determine a type of a primary payment instrument, determine, from a set of primary key generation rules, a primary key generation rule corresponding to the type of the primary payment instrument, the primary key generation rule specifying at least one primary payment instrument element for generating a primary payment key, each primary key generation rule from the set of primary key generation rules corresponding to a different type of primary payment instrument and specifying at least one primary payment instrument element for generating a primary payment key, each primary payment instrument including a set of primary payment instrument elements, generate, according to the primary key generation rule, a primary payment key for the primary payment instrument, and store a corresponding relationship between the primary payment instrument and the primary payment key.

According to a further aspect, the present disclosure provides a non-transitory computer-readable storage medium storing instructions executable by a processor to cause the processor to perform a method for facilitating expansion of primary payment instruments, the method comprising: determining a type of a primary payment instrument, determining, from a set of primary key generation rules, a primary key generation rule corresponding to the type of the primary payment instrument, the primary key generation rule specifying a primary payment instrument element for generating a primary payment key, each primary key generation rule from the set of primary key generation rules corresponding to a different type of primary payment instrument and specifying at least one primary payment instrument element for generating a primary payment key, each primary payment instrument including a set of primary payment instrument elements, generating, according to the primary key generation rule, a primary payment key for the primary payment instrument, and storing a corresponding relationship between the primary payment instrument and the primary payment key.

It can be seen from the above description that, in the primary payment key generation solution according to the present application, a primary payment key can be generated for a primary payment instrument according to a primary key generation rule corresponding to a type of the primary payment instrument. Upon expansion of primary payment instruments, e.g. addition of a new type of primary payment instrument, or addition of a new primary payment instrument element for a primary payment instrument, the primary key generation rule can be updated without the need of re-developing the entire model, thereby significantly reducing development costs.

DETAILED DESCRIPTION

Exemplary embodiments will be described in detail below, and the examples thereof are illustrated in the accompanying drawings. When the description below involves the accompanying drawings, identical numerals in different figures represent identical or similar elements, unless otherwise expressed. The implementation manners described in the exemplary embodiments below do not represent all implementation manners consistent with the present application. Conversely, these implementation manners are merely examples of devices and methods consistent with some aspects of the present application that are described in detail in the appended claims.

Terms used in the present application are intended only for describing some embodiments, instead of limiting the present application. "One," "the," and "that" in singular form used in the present application and the appended claims are also intended to include the plural form thereof, unless other meanings are clearly indicated in the context. The term "and/or" used herein refers to and comprises any or all possible combinations of one or more associated items that are listed.

Terms like first, second, third, and the like may be used in the present application to describe various information; however, the information shall not be limited to these terms. These terms are only used to differentiate information of the same type. For example, the first information may also be referred to as the second information, and similarly, the second information may also be referred to as the first information, provided that the change does not depart from the scope of the present application. Depending on the context, the word "if" used herein can be interpreted as "when," "at the moment when," or "in response to a determination of."

In one example, a user uses an Alipay client to make electronic payments, and the account number of the Alipay client is the cell phone number. First, the user bundles an account number of a third-party payment platform, Baidu Wallet, in the Alipay client, and when the user uses the Alipay client to make electronic payments, a server can generate, based on the current primary key generation model, cyphertext of the Baidu Wallet according to the user's cell phone number and authenticated true name of the user and return the cyphertext. Subsequently, according to the cyphertext, the server can search and find the bundled primary payment instrument, i.e., the Baidu Wallet, of the user.

In another example, the user further bundles an account number of another third-party payment platform, JD Pay. Based on the foregoing primary key generation model, the server can also generate cyphertext of the JD Pay's account according to the user's cell phone number and true name. However, the cyphertext corresponds to the accounts of the two third-party payment platforms, Baidu Wallet and JD Pay. In the subsequent interaction process, it is impossible to determine whether the user chooses Baidu Wallet or JD Pay. Therefore, the foregoing primary key generation model is no longer applicable. A new model has to be developed, which results in significant development costs.

In view of the foregoing, the present application provides a solution for facilitating expansion of primary payment instruments, which can provide a general model for primary payment instruments.

Figure 1:
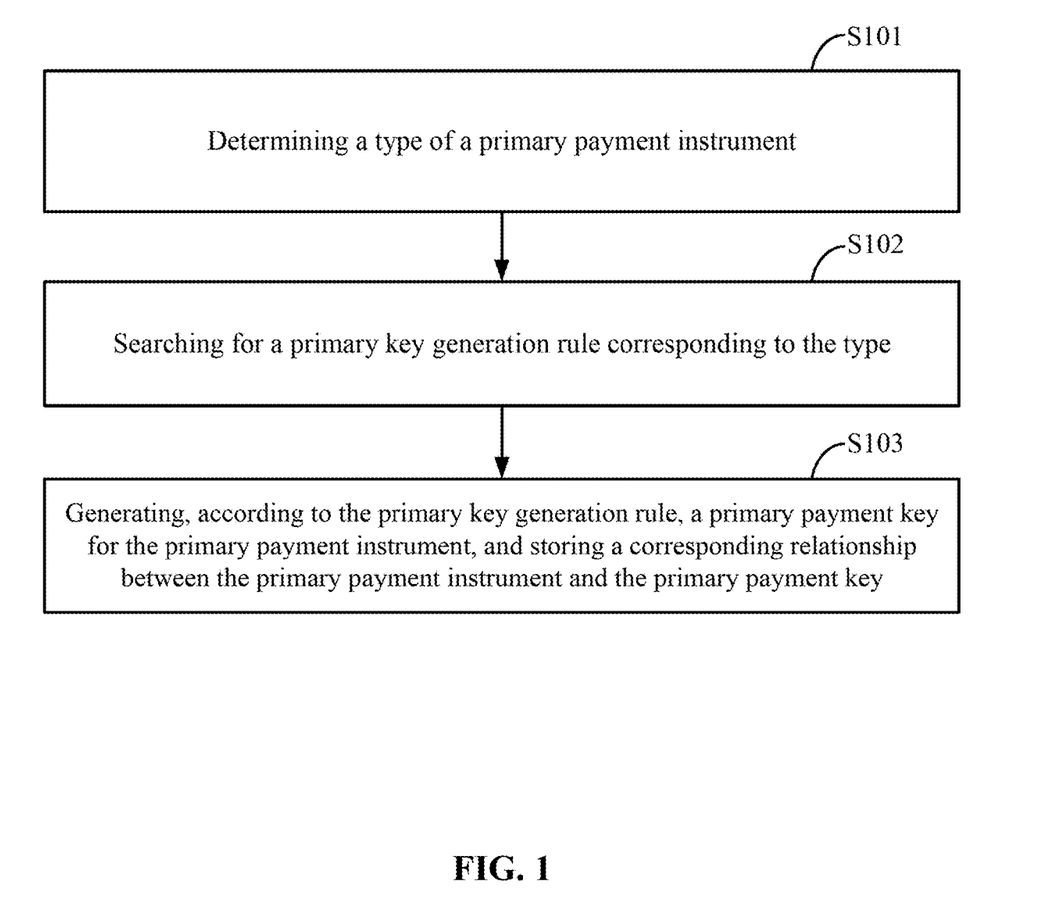
FIG. 1 is a flow chart of an exemplary method for facilitating expansion of primary payment instruments according to some embodiments of the present application.

FIG. 1 is a flow chart of an exemplary method for facilitating expansion of primary payment instruments according to some embodiments of the present application;

Referring to FIG. 1, the method for facilitating expansion of primary payment instruments can be applied on a server and comprise the following steps:

Step 101, determining a type of a primary payment instrument.

In the present embodiment, when making electronic payments, a user typically uses information of a bank card, an account number of a third-party payment platform, and the like to complete the payments. In these processes, the bank card and the account number of a third-party payment platform are the primary payment instruments.

In the present embodiment, the primary payment instrument elements are the information of the primary payment instrument. Taking the primary payment instrument being a credit card for example, the primary payment instrument elements thereof typically comprise: card number, expiration date, security code, account name, and the like. As an example with the primary payment instrument being a third-party payment platform, the primary payment instrument elements thereof typically comprise: account name, platform identification, and the like. Each primary payment instrument corresponds to a unique set of primary payment instrument elements. In other words, a set of primary payment instrument elements can determine a unique primary payment instrument.

In the present embodiment, a server that performs the method for facilitating expansion of primary payment instruments is typically a server deployed by an electronic payment service provider for storing primary payment instruments. As an example with the electronic payment service provider being Alipay, the server is used to store the primary payment instruments, such as bank cards bundled in Alipay by Alipay users, account numbers of third-party payment platforms other than Alipay, and the like.

In the present embodiment, the server can determine a type of a primary payment instrument upon receiving a registration request for the primary payment instrument, wherein the registration request is typically initiated by a user. For example, if the user wants to bundle a newly issued credit card in Alipay, the user can initiate a registration request for the primary payment instrument at an Alipay client (i.e., a bundling request). In one example, the client can include the information of the credit card input by the user, i.e., the primary payment instrument elements of the credit card, in the registration request, and send the registration request to the server. Upon receiving the registration request, the server saves all primary payment instrument elements of the primary payment instrument, and then can determine a type of the primary payment instrument according to the primary payment instrument elements. In exemplary implementations, operations such as user identity authentication typically are to be performed in the process of primary payment instrument registration according to relevant technologies, which will not be elaborated by the present application.

In the present embodiment, a type of a primary payment instrument can comprise bank cards compatible with all networks, deposit books, account numbers of third-party payment platforms, and the like, which can be set by a developer according to features of each primary payment instrument. In one example, the server can first determine, according to a general category identification of the primary payment instrument, a general category to which the primary payment instrument belongs, wherein the general category of the primary payment instrument can be input by the user. For example, when the user bundles the primary payment instrument, the client can provide options of general categories of primary payment instruments for the user to choose. For example, the client can display options such as "Bundle bank card or deposit book" and "Bundle account numbers of third-party payment platforms" for the user, and the user can choose according to the type of the primary payment instrument. When sending the registration request to the server, the client can send the general category identification selected by the user to the server as a primary payment instrument element. When determining a type of the primary payment instrument, the server can first determine, according to the general category identification in the primary payment instrument elements, a general category of the primary payment instrument, and then determine a specific type.

For example, assuming that the general category of a primary payment instrument is a primary payment instrument issued by a financial institution, such as a bank card and a deposit book, the server can further determine whether the primary payment instrument is a bank card compatible with all networks or a deposit book, according to the number of digits of a card number, a character in a preset digit, and other information in the primary payment instrument elements so as to determine a specific type of the primary payment instrument.

Step 102, searching for a primary key generation rule corresponding to the type.

On the basis of the foregoing Step 101, a primary key generation rule corresponding to the type can be searched for after the type of the primary payment instrument is determined, wherein the primary key generation rule can be preset by a developer for generating a primary payment key for the primary payment instrument, typically comprising information such as primary payment instrument elements for generating a primary payment key, a generation algorithm, and the like. Typically, primary key generation rules corresponding to different types of primary payment instruments specify different primary payment instrument elements for generating primary payment keys.

In the present embodiment, the primary payment key is an identification corresponding to the primary payment instrument. One primary payment key can determine a unique primary payment instrument. The primary payment key can be considered as cyphertext generated on the basis of a set of primary payment instrument elements capable of determining a unique primary payment instrument, and can be used for interaction and transmission during electronic payments in place of the primary payment instrument, thereby ensuring the security of the user's primary payment instrument.

Step 103, generating, according to the primary key generation rule, a primary payment key for the primary payment instrument, and storing a corresponding relationship between the primary payment instrument and the primary payment key.

In the present embodiment, after the corresponding relationship between the primary payment instrument and the primary payment key thereof is stored, the server can provide services to requests for primary payment keys and inquiries about primary payment instruments and the like, to other related transaction platforms.

In one example, upon expansion of primary payment instruments, e.g. addition of a new type of primary payment instrument, or addition of a new primary payment instrument element for a primary payment instrument, a developer can update the primary key generation rule to achieve the update of the entire primary payment instrument model.

For example, assuming that, when electronic payment transactions using deposit books as the primary payment instrument are being processed, the primary payment instrument elements for determining deposit books during the electronic payments are expanded to ensure that with respect to the primary payment instruments of the deposit book type, a unique deposit book can be determined according to one set of primary payment instrument elements. Account opening date is added to the original primary payment instrument elements including account number, account name, and bank of account. A developer can update the primary key generation rule according to the newly added account opening date, by, for example, adding a primary payment instrument element, e.g., an account opening date, into the primary key generation rule corresponding to deposit books for generating primary payment keys. After the primary key generation rule is updated, the server can generate a new primary payment key for each of the stored deposit books according to the new primary key generation rule, and then store a corresponding relationship between the deposit books and new primary payment keys thereof without deleting the old primary payment keys. This is because a deposit book can still be found based on the old primary payment key of the deposit book in cases of refunds, customer complaints, and the like regarding electronic payment transactions prior to the update to the primary key generation rule, such that subsequent refunds and customer services can be smoothly implemented.

As shown in the above description that, in the primary payment key generation solution according to the present application, a primary payment key can be generated for a primary payment instrument according to a primary key generation rule corresponding to a type of the primary payment instrument. Upon expansion of primary payment instruments, e.g. addition of a new type of primary payment instrument, or addition of a new primary payment instrument element for a primary payment instrument, only the primary key generation rule is to be updated without having to re-develop the entire model, thereby significantly reducing development costs.

According to some embodiments, the present specification provides a method for facilitating expansion of primary payment instruments. The method may include determining a type of a primary payment instrument, and determining a primary key generation rule from a set of primary key generation rules. The primary key generation rule may correspond to the type of the primary payment instrument and specify a primary payment instrument element for generating a primary payment key. In some embodiments, each primary key generation rule from the set of primary key generation rules may correspond to a different type of primary payment instrument and specify a primary payment instrument element. Each primary payment instrument may include a set of primary payment instrument elements. The method may further include generating, according to the primary key generation rule, a primary payment key for the primary payment instrument, and storing a corresponding relationship between the primary payment instrument and the primary payment key.

Figure 2:
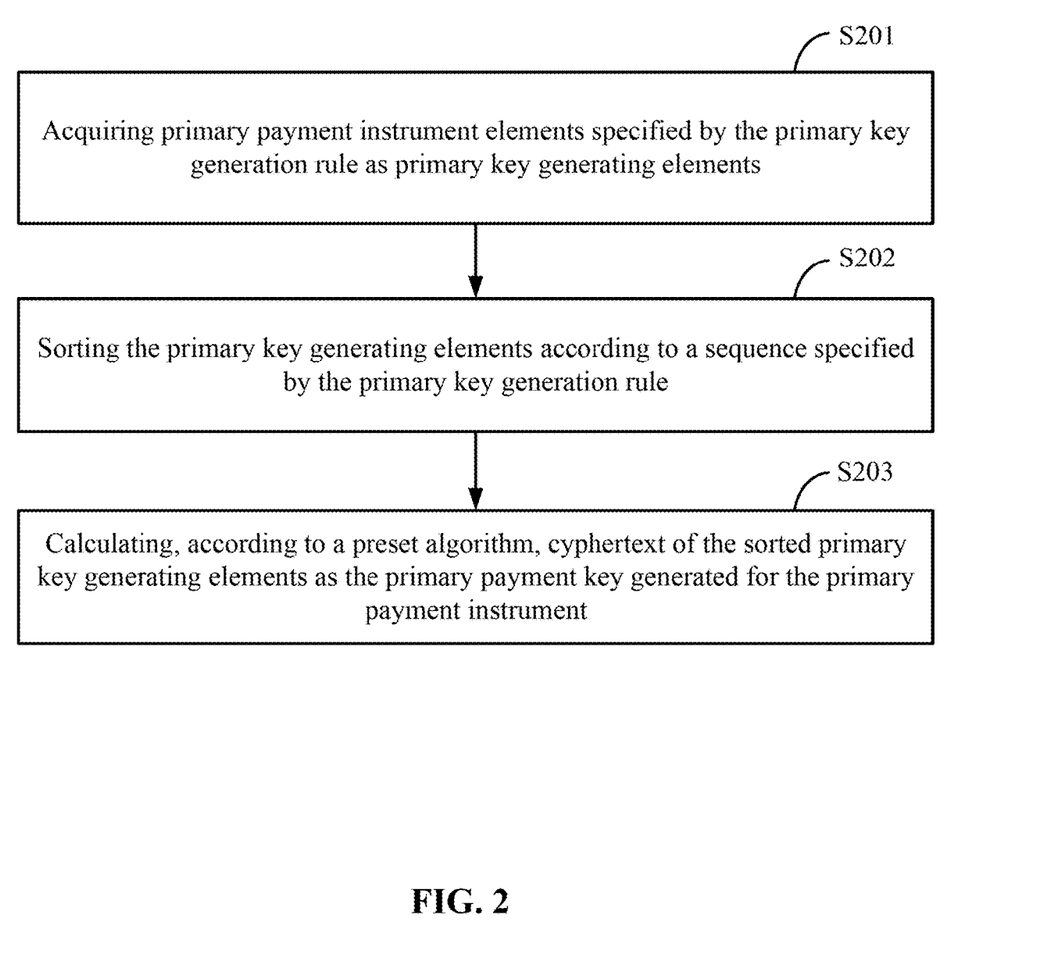
FIG. 2 is a flow chart of an exemplary method for generating a primary payment key for a primary payment instrument according to some embodiments of the present application.

In one example of the present application, referring to FIG. 2, the process of generating, according to the primary key generation rule, a primary payment key for the primary payment instrument can comprise the following steps:

Step 201, acquiring primary payment instrument elements specified by the primary key generation rule as primary key generating elements.

In the present embodiment, primary payment instrument elements that can determine a unique primary payment instrument in the corresponding type of primary payment instrument are specified by the primary key generation rule. For example, assuming that the type of primary payment instrument corresponding to a primary key generation rule is a bank card compatible with all networks, i.e. a type of bank card such as Visa, Mastercard, and the like, then the primary payment instrument elements specified by the primary key generation rule typically comprise card number, account name, and expiration date. Assuming that the type of primary payment instrument corresponding to a primary key generation rule is a deposit book, then the primary payment instrument elements specified by the primary key generation rule typically comprise deposit book account number, account name, and bank of account.

In the present embodiment, the server can acquire primary payment instrument elements specified by the primary key generation rule among all the stored primary payment instrument elements of the primary payment instrument. For ease of description, the acquired primary payment instrument elements specified by the primary key generation rule can be referred to as primary key generating elements.

Step 202, sorting the primary key generating elements according to a sequence specified by the primary key generation rule.

In the present embodiment, the primary key generation rule can further comprise an order of the primary key generating elements for generating a primary payment key, i.e., the order of the primary key generating elements when a primary payment key is generated. On the basis of the foregoing step 201, after the primary key generating elements are acquired, the primary key generating elements can be sorted according to the sequence. Assuming that the primary key generating elements comprise a deposit book account number (1234), an account name (Zhang San), and a bank of account (China Merchants Bank, Beijing Dayuncun Branch), and the sequence specified by the primary key generation rule is account name, deposit book account number, and bank of account, then the primary key generating elements can be sorted as Zhang San, 1234, and China Merchants Bank, Beijing Dayuncun Branch.

Step 203, calculating, according to a preset algorithm, cyphertext of the sorted primary key generating elements as the primary payment key generated for the primary payment instrument.

On the basis of the foregoing step 202, after the primary key generating elements are sorted, the cyphertext of the sorted primary key generating elements can be calculated according to a preset algorithm. The cyphertext is the primary payment key generated for the primary payment instrument. Here, the preset algorithm can be set by a developer, and the preset algorithm can be included in the primary key generation rule, such that the cyphertext generating algorithms used by different primary key generation rules can be different. The developer can also set the same algorithm for all primary key generation rules and store the algorithm at a preset position, such that there is no need to set an algorithm in each primary key generation rule, respectively. The preset algorithm can be MD5 (Message-Digest Algorithm 5), HASH algorithm, and the like, which is not limited in the present application.

Therefore, the primary key generation rule according to the present application can be represented by the following equation: primary payment key=preset algorithm (primary key generating element 1, primary key generating element 2, . . . , primary key generating element N), wherein N is a natural number greater than or equal to 1.

On the basis of the above primary key generation equation, upon expansion of primary payment instruments, e.g., addition of a new primary key generating element, the newly added primary key generating element can be arranged at the last to reduce the workload of code development for adding the primary key generating element. For example, take adding account opening date by the bank for the primary payment instrument of the deposit book type in the foregoing step 103 for instance, the previous primary key generation rule corresponding to primary payment instruments of the deposit book type is: primary payment key=preset algorithm (account name, deposit book account number, bank of account), and the updated primary key generation rule is: primary payment key=preset algorithm (account name, deposit book account number, bank of account, account opening date).

In the present embodiment, by taking the above primary key generation equation as a reference, the server can also sequentially acquire the primary key generating elements according to the sequence of the primary key generating elements specified by the equation, thereby omitting the sorting operation in the foregoing step 202, which is not limited in the present application.

As shown in the above description that the sorting information of the primary key generating elements when a primary payment key is generated is specified by the primary key generation rule according to the present application. Upon expansion of primary payment instruments, e.g., addition of a new primary key generating element, the newly added primary key generating element can be placed at the last to reduce the workload of code development for adding the primary key generating element, thereby saving development costs.

In some embodiments, the process of generating, according to the primary key generation rule, a primary payment key for the primary payment instrument may comprise: acquiring, according to the primary key generation rule, a subset of primary payment instrument elements from the set of primary payment instrument elements, sorting the subset of primary key generating elements according to an order specified by the primary key generation rule, and calculating, according to a preset algorithm, cyphertext of the sorted primary key generating elements as the primary payment key for the primary payment instrument.

Figure 3:
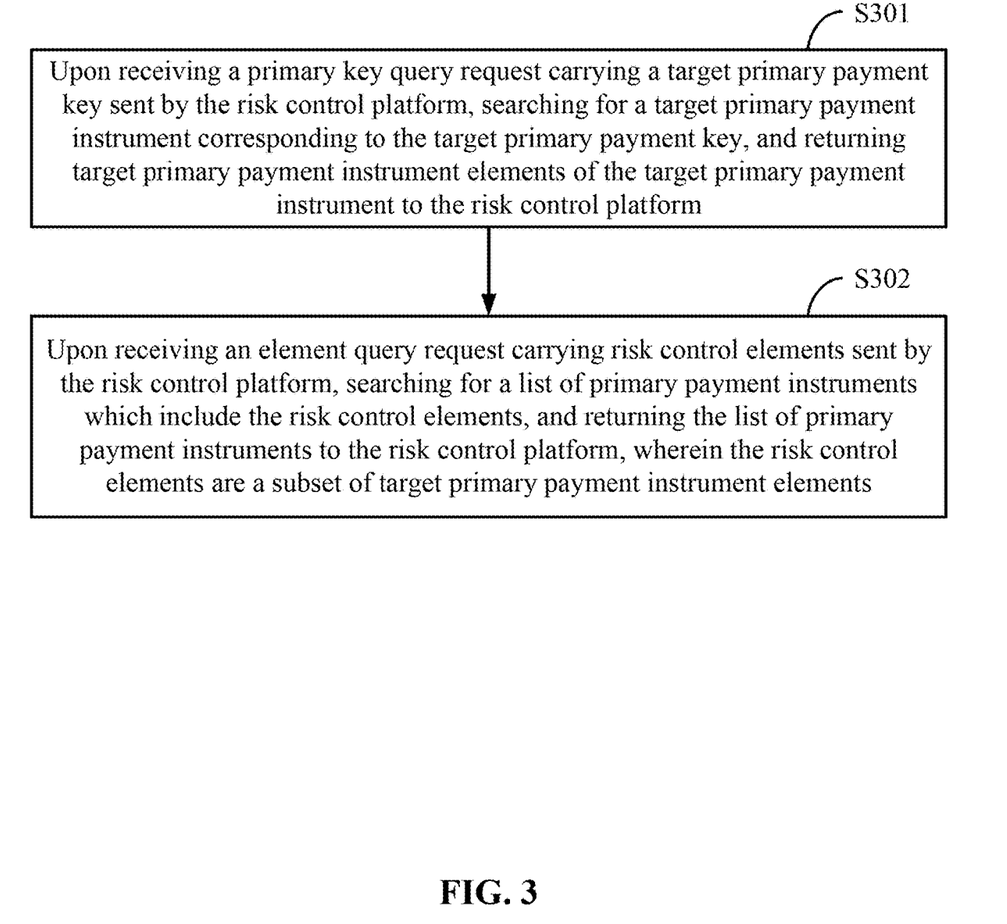
FIG. 3 is a schematic diagram of an exemplary method of interaction between a risk control platform and a server according to some embodiments of the present application.

In another example of the present application, the method for achieving electronic payment security according to the present application can improve a risk control platform's efficiency of recognizing and determining payment risks. Referring to FIG. 3, on the basis of the embodiment shown in FIG. 1, the interaction process between the risk control platform and the server can comprise the following steps:

Step 301, upon receiving a primary key query request carrying a target primary payment key sent by the risk control platform, searching for a target primary payment instrument corresponding to the target primary payment key, and returning all target primary payment instrument elements of the target primary payment instrument to the risk control platform.

In the present embodiment, the risk control platform refers to a server or a server cluster used for risk assessment during an electronic payment process. Upon receiving a primary payment key of an electronic payment, the risk control platform will, for the purpose of risk control, send the primary payment key to the server for storing primary payment instruments in the present application so as to request a query about the primary payment instrument corresponding to the primary payment key. For ease of description, the primary payment key sent by the risk control platform to the server is referred to as a target primary payment key.

In the present embodiment, upon receiving the primary key query request sent by the risk control platform, the server can search for a target primary payment instrument corresponding to the target primary payment key, where the target primary payment instrument corresponds to a set of target primary payment instrument elements. The server may send all target primary payment instrument elements of the target primary payment instrument found through search, instead of only the primary key generating elements for generating the primary payment key, to the risk control platform.

Step 302, upon receiving an element query request carrying risk control elements sent by the risk control platform, searching for a list of primary payment instruments each including the risk control elements, and returning the list of primary payment instruments to the risk control platform, wherein the risk control elements are a subset of all target primary payment instrument elements.

On the basis of the foregoing step 301, after receiving the target primary payment instrument elements returned by the server, the risk control platform can select, according to a preset policy, one or more target primary payment instrument elements from the all target primary payment instrument elements as risk control elements. Then, the risk control platform sends an element query request to the server, and the element query request carries the risk control elements. Upon receiving an element query request, the server searches for all primary payment instruments that include the risk control elements, and then returns a list of the primary payment instruments to the risk control platform. The list of the primary payment instruments also includes all primary payment instrument elements of the found primary payment instruments. The risk control platform can assess risks of this electronic payment more comprehensively and more accurately based on the list of the primary payment instruments.

The process of risk assessment will be described below with reference to examples.

Figure 4:
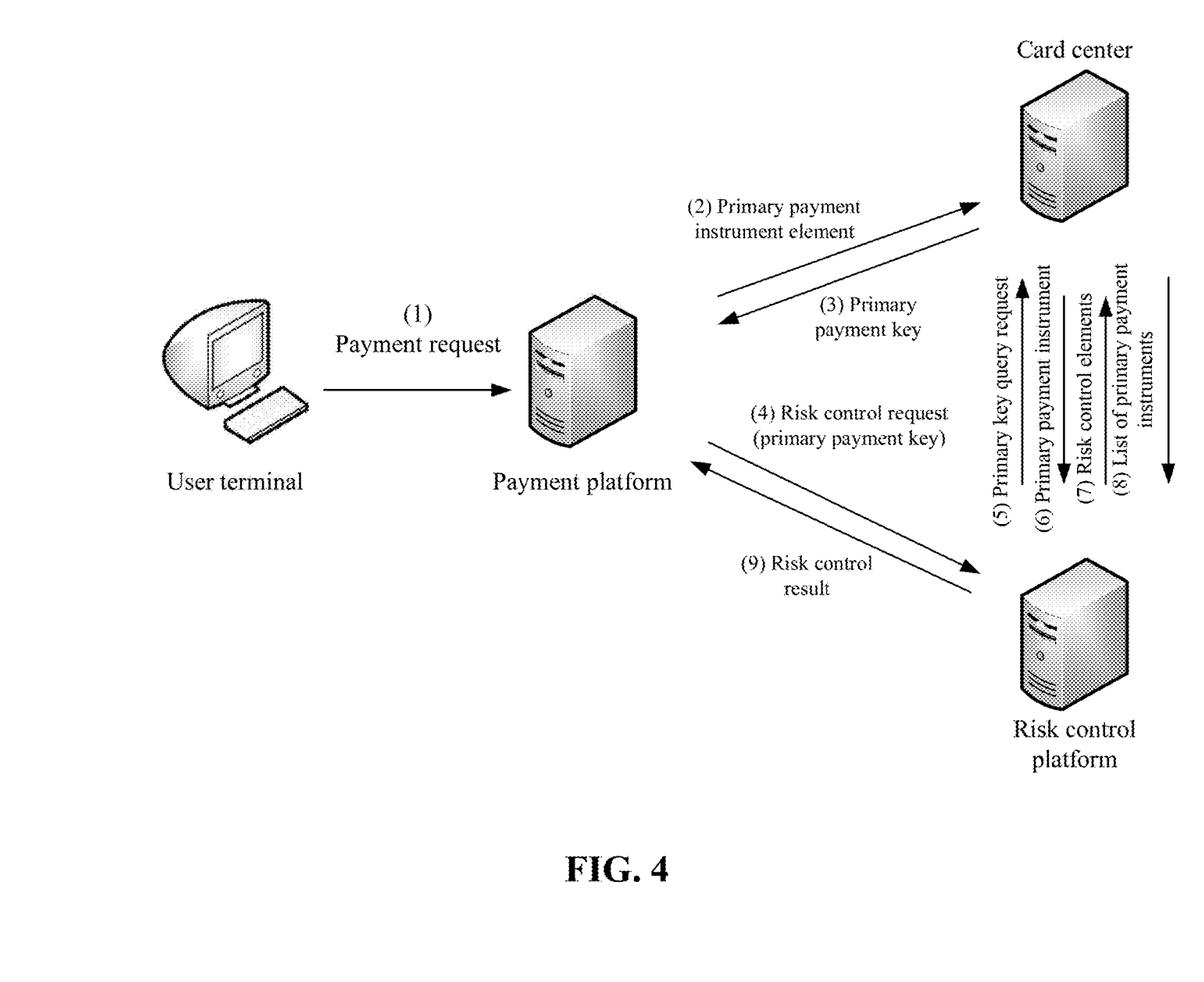
FIG. 4 is a schematic diagram of an exemplary network of interaction between a risk control platform and a server according to some embodiments of the present application.

Referring to FIG. 4, as an example with a relatively simple electronic payment scenario, the user terminal can be a smart terminal device, such as a smart phone, a tablet computer, and a PC, and the user terminal is installed with client software having electronic payment capabilities. The payment platform, risk control platform, or card center is a server or a server cluster deployed by an electronic payment service provider. Here, the payment platform is used to receive payment requests sent from the client and generate electronic payment orders according to the payment requests. The card center is used to store primary payment instruments bundled by users. The risk control platform is used to perform risk assessment on electronic payment requests initiated by the users.

Referring to FIG. 4 again, a risk control process in an electronic payment process can comprise the following steps:

(1) The user terminal sends a payment request to the payment platform.

Take the client software being an Alipay client for example, the user initiates a payment request in the Alipay client, the client will send some payment information of the payment request to the payment platform, and the payment information mainly has two types: primary payment instrument elements and transaction information. As an example with the user choosing to use a credit card for payments, the primary payment instrument elements typically comprise credit card number, account name, and the like, and the transaction information typically comprises payment amount, verification code, and the like.

(2) The payment platform sends a primary key generating request to the card center, and the primary key generating request carries the primary payment instrument elements sent by the client.

At this step, the payment platform sends the primary payment instrument elements carried in the payment request to the card center via the primary key generating request, to request the card center to generate a primary payment key used for subsequent interaction for the primary payment instrument corresponding to the primary payment instrument elements.

(3) The card center returns the primary payment key of the primary payment instrument to the payment platform.

At this step, after receiving the primary payment instrument elements sent by the payment platform, the card center searches for a primary payment instrument matching the primary payment instrument elements in all the stored primary payment instruments, and then returns the primary payment key of the primary payment instrument to the payment platform. Here, the embodiments shown in FIG. 1 or FIG. 2 can be referenced regarding the process in which the card center generates the primary payment key, which will not be repeated herein.

(4) The payment platform sends a risk control request to the risk control platform.

Upon receiving the primary payment key returned by the card center, the payment platform can generate an electronic payment order according to the primary payment key for the electronic payment initiated by the user, and then includes the electronic payment order in the risk control request to send to the risk control platform.

(5) The risk control platform sends a primary key query request to the card center.

Upon receiving the risk control request for the electronic payment order, the risk control platform can obtain the primary payment key from the electronic payment order through parsing, and then sends the primary payment key to the card center as a query about the primary payment instrument corresponding to the primary payment key.

(6) The card center returns the primary payment instrument corresponding to the primary payment key to the risk control platform.

Upon receiving the primary key query request sent by the risk control center, the card center searches for the primary payment instrument corresponding to the primary payment key, and then returns all primary payment instrument elements of the found primary payment instrument to the risk control center.

(7) The risk control platform sends a risk control element query request to the card center.

Upon receiving all primary payment instrument elements of the primary payment instrument returned by the card center, the risk control platform can select, according to a preset policy, one or more primary payment instrument elements from the primary payment instrument elements as risk control elements, and then send the risk control element query request to the card center to query all primary payment instruments that comprise the risk control elements stored in the card center.

For example, the primary payment instrument elements corresponding to the primary payment instrument returned by the card center in the previous step comprise: credit card number, account name, expiration date, bank of account, user ID number, and security verification code. According to the policy set by the developer, the user ID number is selected as the risk control element, and then the user ID number is carried in the risk control element query request and sent to the card center again.

(8) The card center returns the list of all primary payment instruments comprising the risk control element to the risk control platform.

Upon receiving the risk control element query request carrying the user ID number and sent by the risk control platform, the card center can search for all primary payment instruments comprising the user ID number in the primary payment instrument elements, and then return the list of all primary payment instruments to the risk control platform. The list of the primary payment instruments includes the primary payment instrument elements of each primary payment instrument.

In the example of the previous step, the card center search for all primary payment instruments comprising the above primary payment instrument element (the above user ID number). If the card center finds two bank cards having a user ID number that is the above ID number), the card center can then return the primary payment instrument elements of the both bank cards to the risk control platform.

(9) The risk control platform performs risk assessment according to the list of the primary payment instruments, and returns a result of risk assessment to the payment platform.

Upon receiving the list of the primary payment instruments, the risk control platform can perform risk assessment on the electronic payment according to historical transaction parameters of all primary payment instruments in the list of the primary payment instruments, and return an assessment result to the payment platform. When the assessment result is safe, the payment platform can continue to complete the electronic payment process. When the assessment result is a high risk, the payment platform can return a risk prompt to the client.

If the card center finds two bank cards according to the user ID number, upon receiving the information of the two bank cards (the primary payment instrument elements of the two bank cards), the risk control platform can perform risk assessment on the electronic payment according to historical transaction data of the two bank cards. The risk control platform can find whether the user who initiates the electronic payment has conducted risky actions in electronic transactions using other bank cards, such as non-compliant operations, or the like, and then perform more comprehensive and accurate risk assessment on the electronic payment.

As shown in the above description that, in the primary payment key generation solution according to the present application, the risk control platform can find, through two queries, a list of primary payment instruments that can be used in risk assessment, and then can provide more comprehensive and accurate risk assessment for electronic payments and improve security of the electronic payments.

Corresponding to the above embodiments of the method for facilitating expansion of primary payment instruments, the present application further provides some embodiments of the device for facilitating expansion of primary payment instruments.

Figure 5:
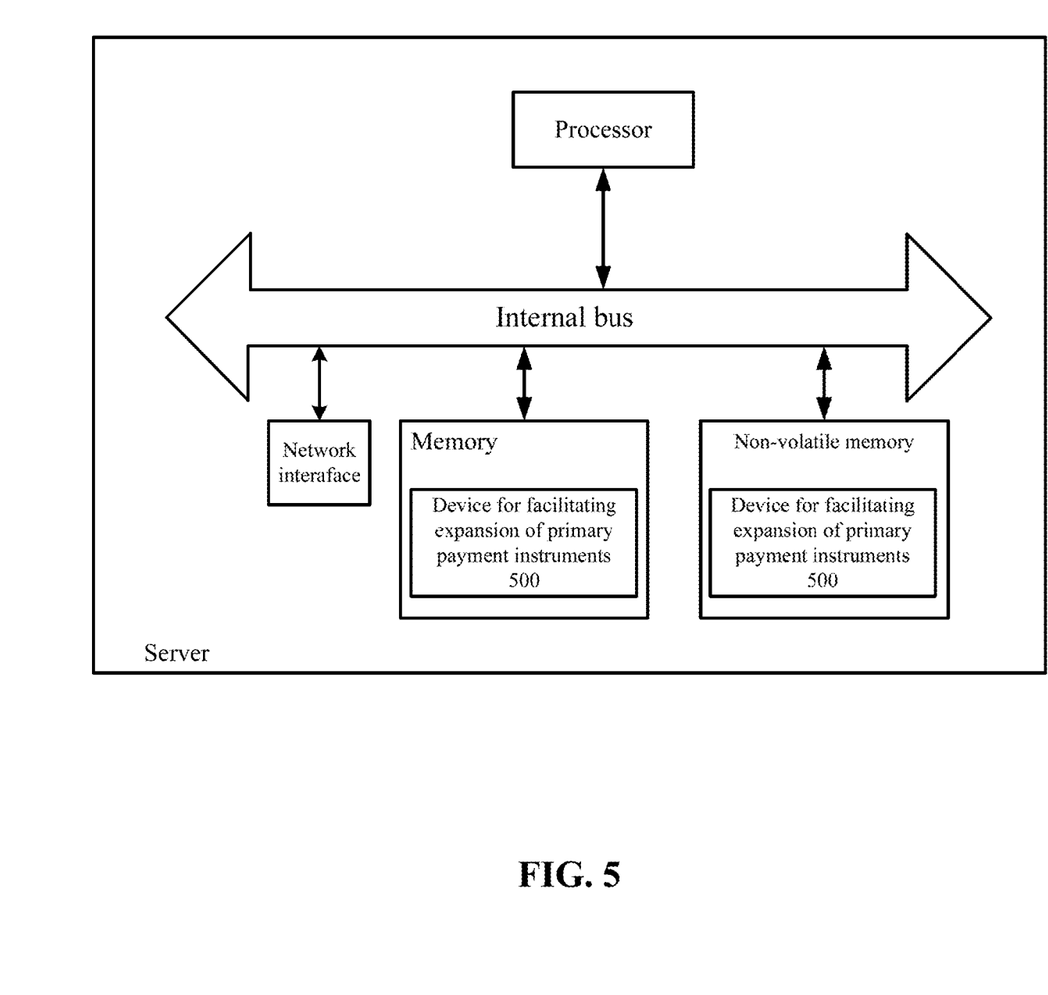
FIG. 5 is a schematic structural diagram of an exemplary device for facilitating expansion of primary payment instruments according to some embodiments of the present application.

FIG. 5 is a schematic structural diagram of an exemplary device for facilitating expansion of primary payment instruments according to some embodiments of the present application. The device in FIG. 5 for facilitating expansion of primary payment instruments of the present application can be applicable on a server. The device in FIG. 5 can be implemented by software, hardware, or a combination of software and hardware. In an example of software implementation, the device in a logic sense is formed by a processor in the server on which the device is disposed reading a corresponding computer program instruction from a non-volatile memory into memory for running. That is, the device in FIG. 5 may comprise a processor and a non-transitory computer-readable storage medium storing instructions 500 that, when executed by the processor, cause one or more components of the device (e.g., the processor) to perform various steps and methods described above. From the perspective of a hardware layer, FIG. 5 is a hardware structural diagram of a server on which the device for facilitating expansion of primary payment instruments is disposed according to the present application. In addition to the processor, memory, network interface, and non-volatile memory shown in FIG. 5, the server on which the device is disposed in the embodiment may typically further comprise other hardware according to actual functions of the server, which will not be repeated herein. In some embodiments, the device in FIG. 5 may be referred to as a system for facilitating expansion of primary payment instruments.

Figure 6:
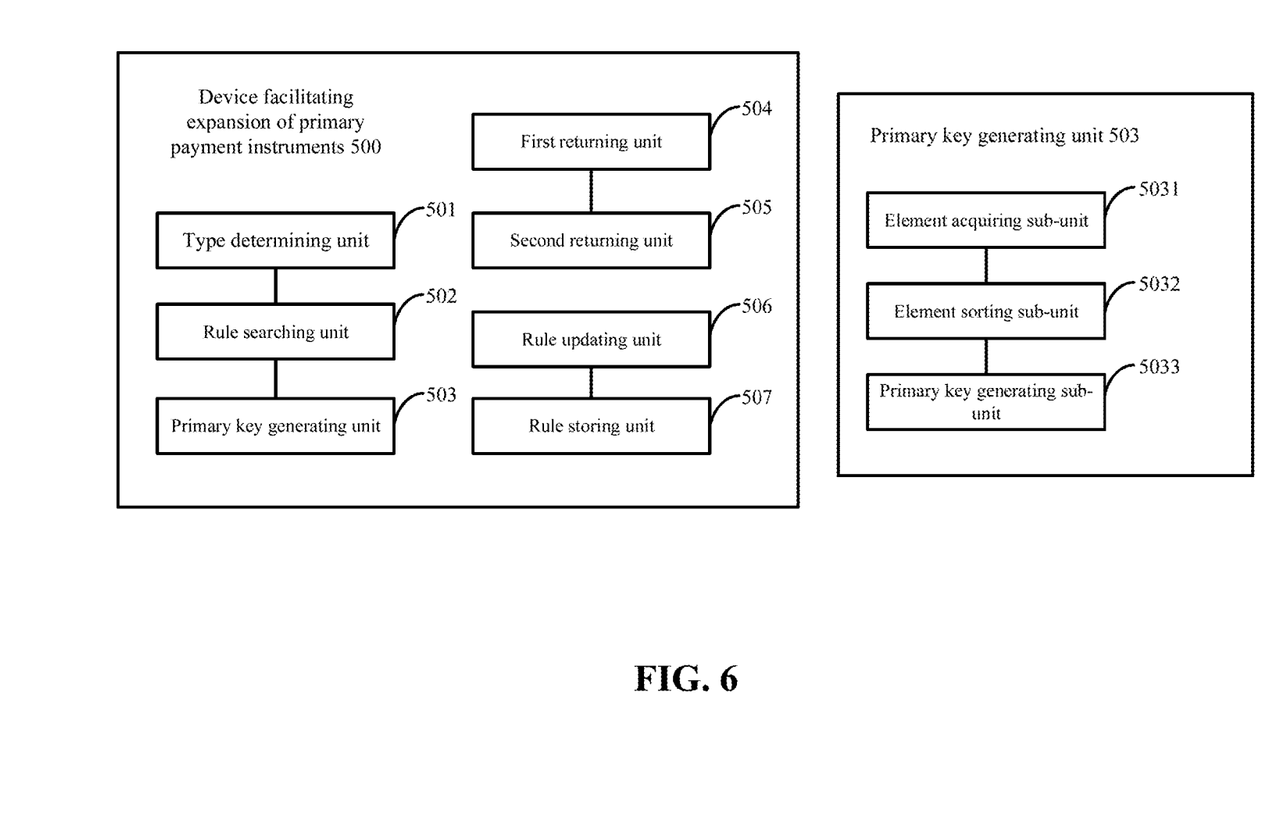
FIG. 6 is a structural block diagram of an exemplary device for facilitating expansion of primary payment instruments according to some embodiments of the present application.

FIG. 6 is a structural block diagram of an exemplary device for facilitating expansion of primary payment instruments according to the present application. Referring to FIG. 6, the device for facilitating expansion of primary payment instruments 500 can be applied in the server shown in FIG. 5 and comprise: a type determining unit 501, a rule searching unit 502, a primary key generating unit 503, a first returning unit 504, a second returning unit 505, a rule updating unit 506, and a rule storing unit 507. Here, the primary key generating unit 503 can further comprise: an element acquiring sub-unit 5031, an element sorting sub-unit 5032, and a primary key generating sub-unit 5033.

In some embodiments, the type determining unit 501 may be configured to determine a type of a primary payment instrument;

the rule searching unit 502 may be configured to search for a primary key generation rule corresponding to the type; and the primary key generating unit 503 may be configured to generate, according to the primary key generation rule, a primary payment key for the primary payment instrument, and store a corresponding relationship between the primary payment instrument and the primary payment key;

wherein the primary key generation rule specifies a primary payment instrument element for generating the primary payment key, and wherein primary key generation rules corresponding to different types of the primary payment instruments specify different primary payment instrument elements for generating primary payment keys.

The element acquiring sub-unit 5031 may be configured to acquire primary payment instrument elements specified by the primary key generation rule as primary key generating elements;

the element sorting sub-unit 5032 may be configured to sort the primary key generating elements according to a sequence specified by the primary key generation rule; and the primary key generating sub-unit 5033 may be configured to calculate, according to a preset algorithm, cyphertext of the sorted primary key generating elements as the primary payment key generated for the primary payment instrument.

The first returning unit 504 may be configured to search, upon receiving a primary key query request carrying a target primary payment key sent by a risk control platform, for a target primary payment instrument corresponding to the target primary payment key, and returns all target primary payment instrument elements of the target primary payment instrument to the risk control platform; and the second returning unit 505 may be configured to search, upon receiving an element query request carrying risk control elements sent by the risk control platform, for a list of primary payment instruments including the risk control elements, and returns the list of primary payment instruments to the risk control platform, wherein the risk control elements are a subset of the all target primary payment instrument elements.

In some embodiments, the type determining unit 501 may be configured to determine, upon receiving a registration request for a primary payment instrument, a type of the primary payment instrument.

When the primary key generation rule is updated, the rule updating unit 506 may be configured to re-generate, according to the updated primary key generation rule, another primary payment key for the primary payment instrument; and the rule storing unit 507 may be configured to store, on the basis of storing the corresponding relationship between the primary payment instrument and the original primary payment key thereof, a corresponding relationship between the primary payment instrument and the re-generated primary payment key.

For detailed information regarding implementation of the functions and roles of each unit of the above device, the implementation process of corresponding steps in the above method can be referenced, which will not be repeated herein.

Since the device embodiment substantially corresponds to the method embodiment, relevant parts can be referenced in the description of the method embodiment. The device embodiment described above is merely exemplary, where the units described as separate parts may or may not be physically separated. The parts displayed as units may or may not be physical units, i.e., they can be at the same place or be distributed to a plurality of network units. Some or all modules thereof may be selected as needed to achieve the objective of the solution of the present application. The present application can be understood and implemented by one of ordinary skill in the art without creative effort.

Only preferred embodiments of the present application are described above, and the embodiments are not used to limit the present application. Any modifications, equivalent substitutions, and improvements made within the spirit and principle of the present application shall fall within the scope of the present application.

What is claimed is:

1. A method for generating primary payment keys for primary payment instruments, the method comprising:
   determining, by a server, a type of a primary payment instrument;
   determining, by the server from a set of primary key generation rules, a primary key generation rule corresponding to the type of the primary payment instrument;
   acquiring, by the server according to the determined primary key generation rule, a list of primary payment instrument elements of the primary payment instrument;
   sorting, by the server, the primary payment instrument elements according to an order specified by the primary key generation rule;
   generating, by the server according to a hash algorithm, first cyphertext of the sorted primary payment instrument elements as a first primary payment key for the primary payment instrument;
   acquiring, by the server, a new primary payment instrument element of the primary payment instrument;

updating, by the server based on the new primary payment instrument element of the primary payment instrument, the primary key generation rule for the primary payment instrument;

generating, by the server, an updated list by adding the new primary payment instrument element to the end of the list of primary payment instrument elements such that the new primary payment instrument element is the last in the updated list;

generating, by the server according to the hash algorithm, second cyphertext of the updated list as a second primary payment key for the primary payment instrument;

storing, by the server, a corresponding relationship between the primary payment instrument and the first primary payment key and the second primary payment key; and providing, by the server, a response to an inquiry about the primary payment instrument based on the stored corresponding relationship.

2. The method according to claim 1, further comprising:
receiving, by the server from a risk control platform, a primary key query request comprising information of a target primary payment key;

searching, by the server, for a target primary payment instrument corresponding to the target primary payment key, wherein the target primary payment instrument corresponds to a set of target primary payment instrument elements; and sending, by the server to the risk control platform, the set of target primary payment instrument elements of the target primary payment instrument.

3. The method according to claim 2, further comprising:
receiving, by the server from the risk control platform, an element query request comprising risk control elements, wherein the risk control elements are a subset of the set of target primary payment instrument elements;

searching, by the server, for a list of primary payment instruments corresponding to one of the risk control elements; and sending, by the server, the list of primary payment instruments to the risk control platform.

4. The method according to claim 1, wherein determining the type of the primary payment instrument comprises:
receiving, by the server, a registration request for the primary payment instrument; and
determining the type of the primary payment instrument.

5. The method according to claim 1, further comprising:
updating, by the server, the set of the primary key generation rules based on an addition of at least one of a new type of primary payment instrument or (ii) a new primary payment instrument element of an existing type of primary payment instrument.

6. The method according to claim 1, further comprising:
receiving, by the server, a request of adding a primary payment instrument from a user,
wherein determining the type of the primary payment instrument comprises determining the type of the primary payment instrument in the request.

7. A device for generating primary payment keys for primary payment instruments, comprising:
one or more processors; and
one or more computer-readable memories coupled to the one or more processors and configured with instructions executable by the one or more processors to cause the device to:

determine a type of a primary payment instrument;
determine, from a set of primary key generation rules, a primary key generation rule corresponding to the type of the primary payment instrument;
acquire, according to the determined primary key generation rule, a list of primary payment instrument elements of the primary payment instrument;
sort the primary payment instrument elements according to an order specified by the primary key generation rule;
generate, according to a hash algorithm, first cyphertext of the sorted primary payment instrument elements as a first primary payment key for the primary payment instrument;
acquire a new primary payment instrument element of the primary payment instrument;
update, based on the new primary payment instrument element of the primary payment instrument, the primary key generation rule for the primary payment instrument;
generate an updated list by adding the new primary payment instrument element to the end of the list of primary payment instrument elements such that the new primary payment instrument element is the last in the updated list;
generate, according to the hash algorithm, second cyphertext of the updated list as a second primary payment key for the primary payment instrument;
store a corresponding relationship between the primary payment instrument and the first primary payment key and the second primary payment key; and
provide a response to an inquiry about the primary payment instrument based on the stored corresponding relationship.

8. The device according to claim 7, wherein the one or more computer-readable memories are configured with the instructions executable by the one or more processors to further cause the device to:
receive, from a risk control platform, a primary key query request comprising information of a target primary payment key;
search for a target primary payment instrument corresponding to the target primary payment key, wherein the target primary payment instrument corresponds to a set of target primary payment instrument elements; and
send, to the risk control platform, the set of target primary payment instrument elements of the target primary payment instrument.

9. The device according to claim 8, wherein the one or more computer-readable memories are configured with the instructions executable by the one or more processors to further cause the device to:
receive, from the risk control platform, an element query request comprising risk control elements, wherein the risk control elements are a subset of the set of target primary payment instrument elements;
search for a list of primary payment instruments corresponding to one of the risk control elements; and
send the list of primary payment instruments to the risk control platform.

10. The device according to claim 7, wherein, to determine the type of the primary payment instrument, the one or more computer-readable memories are configured with the instructions executable by the one or more processors to further cause the device to:
receive a registration request for the primary payment instrument; and
determine the type of the primary payment instrument.

11. The device according to claim 7, wherein the one or more computer-readable memories are configured with the instructions executable by the one or more processors to further cause the device to:
update the set of primary key generation rules based on an addition of at least one of a new type of primary payment instrument or (ii) a new primary payment instrument element of an existing type of primary payment instrument.

12. The device according to claim 7, wherein the one or more computer-readable memories are configured with the instructions executable by the one or more processors to further cause the device to:
receive a request of adding a primary payment instrument from a user,
wherein to determine the type of the primary payment instrument comprises to determine the type of the primary payment instrument in the request.

13. A non-transitory computer-readable storage medium storing instructions executable by a processor to cause the processor to perform operations comprising:
determining a type of a primary payment instrument;
determining, from a set of primary key generation rules, a primary key generation rule corresponding to the type of the primary payment instrument;
acquiring, according to the determined primary key generation rule, a list of primary payment instrument elements of the primary payment instrument;
sorting the primary payment instrument elements according to an order specified by the primary key generation rule;
generating, according to a hash algorithm, first cyphertext of the sorted primary payment instrument elements as a first primary payment key for the primary payment instrument;
acquiring a new primary payment instrument element of the primary payment instrument;
updating, based on the new primary payment instrument element of the primary payment instrument, the primary key generation rule for the primary payment instrument;
generating an updated list by adding the new primary payment instrument element to the end of the list of primary payment instrument elements such that the new primary payment instrument element is the last in the updated list;
generating according to the hash algorithm, second cyphertext of the updated list as a second primary payment key for the primary payment instrument;
storing a corresponding relationship between the primary payment instrument and the first primary payment key and the second primary payment key; and
providing a response to an inquiry about the primary payment instrument based on the stored corresponding relationship.

14. The non-transitory computer-readable storage medium in claim 13, wherein the operations further comprise:
receiving, from a risk control platform, a primary key query request comprising information of a target primary payment key;
searching for a target primary payment instrument corresponding to the target primary payment key, wherein the target primary payment instrument corresponds to a set of target primary payment instrument elements; and
sending, to the risk control platform, the set of target primary payment instrument elements of the target primary payment instrument.

15. The non-transitory computer-readable storage medium in claim 14, wherein the operations further comprise:
receiving, from the risk control platform, an element query request comprising risk control elements, wherein the risk control elements are a subset of the set of target primary payment instrument elements;
searching for a list of primary payment instruments corresponding to one of the risk control elements; and
sending the list of primary payment instruments to the risk control platform.

16. The non-transitory computer-readable storage medium in claim 13, wherein determining the type of the primary payment instrument comprises:
Receiving a registration request for the primary payment instrument; and
determining the type of the primary payment instrument.

17. The non-transitory computer-readable storage medium in claim 13, wherein the operations further comprise:
updating the set of the primary key generation rules based on an addition of (i) at least one of a new type of primary payment instrument or (ii) a new primary payment instrument element of an existing type of primary payment instrument.

18. The non-transitory computer-readable storage medium in claim 13, wherein the operations further comprise:
receiving a request of adding a primary payment instrument from a user,
wherein determining the type of the primary payment instrument comprises determining the type of the primary payment instrument in the request.

* * * * *

UNITED STATES PATENT AND TRADEMARK OFFICE
CERTIFICATE OF CORRECTION

| | |
|---|---|
| PATENT NO. | : 11,531,984 B2 |
| APPLICATION NO. | : 16/227527 |
| DATED | : December 20, 2022 |
| INVENTOR(S) | : Song Xu |

It is certified that error appears in the above-identified patent and that said Letters Patent is hereby corrected as shown below:

In the Claims

Claim 5, Column 15, Line 51:
"based on an addition of at least one" should read -- based on an addition of (i) at least one --.

Claim 11, Column 17, Line 6:
"based on an addition of at least one" should read -- based on an addition of (i) at least one --.

Signed and Sealed this
Twenty-ninth Day of August, 2023

*Katherine Kelly Vidal*

Katherine Kelly Vidal
*Director of the United States Patent and Trademark Office*